July 16, 1940.      F. H. HOPKINS      2,207,807
PRESSURE RESPONSIVE INDICATING APPARATUS
Filed April 1, 1937
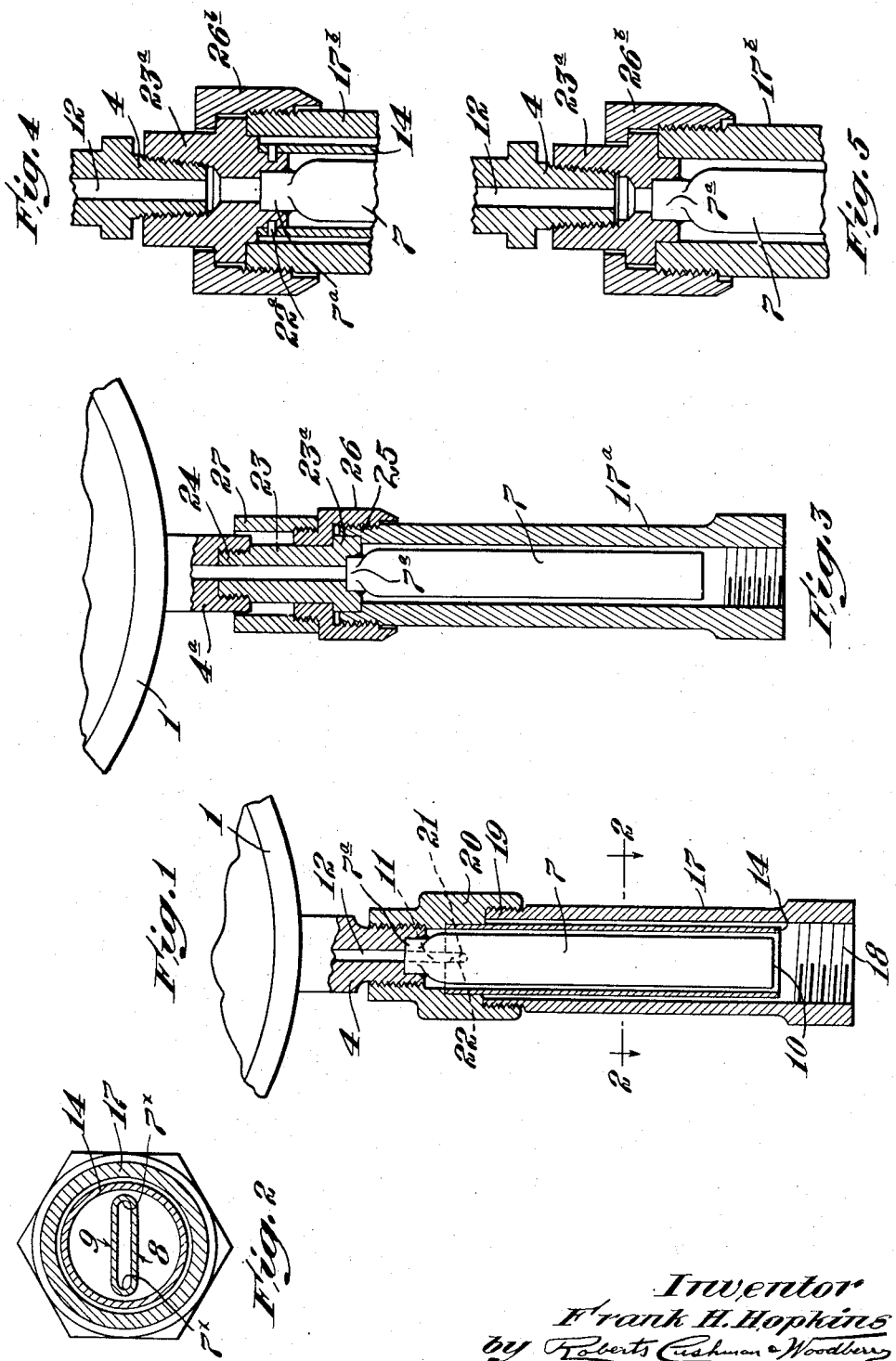
Inventor
Frank H. Hopkins
by Roberts Cushman & Woodberry
attys.

Patented July 16, 1940

2,207,807

UNITED STATES PATENT OFFICE 2,207,807

PRESSURE RESPONSIVE INDICATING APPARATUS

Frank H. Hopkins, Bridgeport, Conn., assignor, by mesne assignments, to Manning, Maxwell & Moore, Incorporated, New York, N. Y., a corporation of New Jersey Application April 1, 1937, Serial No. 134,312

2 Claims. (Cl. 73—31)

This invention pertains to pressure-responsive indicating and/or recording instruments, for example, pressure gauges. In many types of pressure-responsive instruments, including pressure gauges of the Bourdon type, the pressure fluid, for example, water or air whose pressure is to be measured, indicated or recorded, is allowed to enter the instrument and to contact a movable expansible or deformable part, thereby to actuate the moving elements of the instrument, but when the pressure fluid, such, for example, as a chemical substance, is of a corrosive nature, or contains solids in suspension, for instance when the fluid is muddy water, it is not permissible to allow the fluid to enter the instrument whose accuracy and usefulness would soon be destroyed by the action of the fluid or the suspended solids upon its sensitive and somewhat delicate parts. To avoid the above difficulty it has heretofore been proposed to interpose a barrier, for example a flexible diaphragm, of a material not easily injured by the pressure fluid, between the pressure-sensitive element of the instrument and the pressure fluid supply, and to provide a body of mobile liquid, for example, glycerine or oil for transmitting pressure from the diaphragm to the pressure-sensitive element of the instrument. While a diaphragm or equivalent device will function for such purpose and in practice is useful at low pressures, it is not desirable at the high pressures now quite commonly encountered in engineering practice, for example, pressures of the order of from 5000 to 10,000 lbs. per square inch, since in order to withstand such high pressures the diaphragm housing and fittings become so massive as to be unsightly, space-consuming and out of proportion to the instrument, as well as being expensive to make and install. Moreover, unless the diaphragm be of some very flexible material, for example rubber, its interposition between the fluid and the instrument may introduce a substantial error due to the inherent characteristics of the diaphragm material, particularly if the pressure fluid be at a high temperature. Moreover, if in such an arrangement, the Bourdon tube should burst, as sometimes happens, the flexible diaphragm would almost certainly burst also, thus permitting the high pressure fluid to enter the gauge casing, break the glass, and escape into the space in which the gauge is located, with possible disastrous results.

The present invention has for one of its objects the provision of means whereby the pressure-responsive instrument of the class described may be safely used for indicating, measuring or recording the pressure either above or below atmospheric of any fluid, whether or not corrosive or otherwise normally injurious to such an instrument; which will be useful and safe at any pressure no matter how high; but which occupies but little space; is light in weight; inexpensive; and is easy to construct, install and clean.

A further object of the invention is to provide means of the class described such that variations in temperature will not seriously affect the accuracy of the instrument.

A further object of the invention is to provide means adjunctive to a pressure-responsive instrument of the class described such that even though the normally fluid medium whose pressure is to be measured assumes a solid or semi-solid condition at times, for example at relatively low temperatures, the pressure-responsive instrument may be relied upon accurately to show changes in pressure as soon as normal conditions are restored or approached.

A further object is to provide means operative automatically to shut off the passage leading to the gauge if, by accident, the pressure-responsive element of the gauge, for example, the Bourbon tube, is ruptured, thereby to prevent escape of the pressure medium through the instrument.

Other objects and advantages of the invention will be pointed out more in detail in the following description and by reference to the annexed drawing in which Fig. 1 is a vertical section, partly broken away and partly in elevation, illustrating one desirable embodiment of the invention as applied to a conventional pressure gauge;

Fig. 2 is a transverse section on the line 2—2 of Fig. 1, to larger scale;

Fig. 3 is a view generally similar to Fig. 1 but illustrating a modified arrangement; and Figs. 4 and 5 are fragmentary vertical sections illustrating desirable ways of connecting the pressure flask and gauge.

As the result of extended experiment it has been discovered that by attaching a hollow body of resilient material (for example a flat tube closed at its free end) to the inlet of the instrument and filling the system, including said hollow body and the fluid-receiving cavities of the instrument, completely full of a mobile liquid, for example oil, and then exposing the exterior surface of the resilient hollow body to the pressure fluid, the variations in the pressure of the latter will be accurately transmitted to the instrument while the latter is effectively protected from direct contact with the pressure fluid. Such a resilient hollow body, which may for convenience be here referred to as a "pressure flask," may be of external transverse dimensions slightly, if any, greater than those of the usual attaching stem of the instrument, and need not be of great length, so that it occupies but little room and, as installed, is concealed from view and in some embodiments at least its presence is not even discernible. Moreover, such a pressure flask or tube may be made so sensitive to pressure variations that its use does not introduce any substantial inaccuracy in the operation of the instrument while by a proper application of the general principle of the invention it is possible to neutralize the effects of temperature variation in the instrument so that the instrument may be used with certainty of accuracy of operation, even though exposed to great temperature changes. A device made in accordance with the above principle is easily installed and occupies but little space and does not detract from the appearance of the gauge and neighboring appliances.

Referring to the drawing, and particularly to Fig. 1, the numeral 1 designates a pressure gauge of conventional Bourdon type, as exemplifying any pressure-responsive instrument either for indicating, recording or measuring pressure variations and including a movable or deformable element such for example as a Bourdon tube sensitively responsive to pressure variations. The gauge 1 is furnished with a screw-threaded stem 4 through which extends a longitudinal passage 12 which communicates with the interior of the Bourdon tube.

In accordance with that embodiment of the invention shown in Figs. 1 and 2, for example, a pressure flask 7 is associated with the stem 4 of the gauge. This "flask" is a thin-walled tube of resilient material, for instance rubber, hard copper or the like, having a neck portion 7ª at one end, such neck portion preferably being tubular and cylindrical, the body portion of the flask being diametrically flattened to provide substantially parallel flat walls 8 and 9 (Fig. 2). The flask is permanently closed at its bottom 10. A diametrically flattened tube is advantageous as compared with a tube of circular transverse section as it responds more sensitively to pressure fluctuations and is also readily responsive to subatmospheric pressure changes. As above stated, the tube is contracted at its upper end to form the thick-walled tubular neck 7ª having a passage 11 leading from the interior of the flask and which communicates with the longitudinal passage 12 in the stem 4 of the gauge. While the tube or 'flask" is here shown as having the contracted thickened neck portion 7ª which forms a convenient attaching member, it is to be understood that the flask need not have a contracted or relatively thicker neck and may be of substantially full diameter at its attaching portion if preferred. Preferably the neck 7ª fits snugly into an axial bore or socket in the lower end of the stem 4 of the gauge and is thereby restrained against radial expansion. The neck 7ª is welded or otherwise permanently bonded to the lower end of the stem 4 in such a manner as to prevent any possible leakage of pressure fluid inwardly around the neck and into the passage 12 of the gauge stem.

The arrangement above described is useful without further adjunctive features. For example, the stem 4 of the gauge or other instrument may be screwed directly into an opening in the wall of a pressure container (for instance a steam generator) the pressure flask 7 being thus directly exposed to the pressure fluid within such container. As the pressure varies, the flat substantially parallel thin walls 8 and 9 of the flask (which are united along their lateral edges by integral outwardly bowed portions 7ˣ (Fig. 2) of the wall of the flask) approach or recede, and in so doing exert pressure upon a body of fluid, preferably a liquid with which the flask, the passages 11 and 12, and the Bourdon tube of the gauge are completely filled. The variation in pressure actuates the Bourdon tube and thus operates the gauge movement. However, the pressure fluid in the container cannot reach the interior of the gauge and the latter is protected against any injurious action of the pressure fluid. Thus the gauge may be depended upon to operate with accuracy for a period normal to such a gauge if it were employed with fluids of non-injurious character. Moreover, if the Bourdon tube should break, the flask will immediately collapse in response to the external pressure and thus effectively shut off the pressure medium from the gauge so that no substantial injury will be done. While, as above stated, it is preferable under most circumstances to employ a pressure flask made of a material which is so sensitively responsive to pressure variations as to have an inappreciable effect upon the operation of the gauge, it is contemplated as within the scope of the invention to employ a pressure flask so devised as itself to offer substantial resistance to deformation, so that when it is associated with the gauge it has the effect of raising the pressure range of the latter.

While the pressure flask may be used, as above noted, without adjunctive features, it may be preferred, under some circumstances, to provide the pressure flask with a protective casing to avoid mechanical or other injury to this rather sensitive element. Thus, for instance, as shown in Fig. 1, the pressure flask 7 may be guarded by means of a rigid cylindrical tube or guard cylinder 14. The tube or guard cylinder 14 reaches down to a point preferably below the lower end 10 of the pressure flask 7 and is open at such lower end so as to admit the pressure fluid to act freely upon the outer surface of the flask.

This casing 14 thus prevents mechanical injury to the flask 7 when the structure is removed from its support and also prevents injury by contact with any solid materials which may be circulated or otherwise moved within the container when the flask is in use. Furthermore, if the fluid in the generator or container be of a kind which solidifies when cool, the tube 14 permits the pressure gauge to be removed from the container without danger of injury to the flat tube or flask. This is by reason of the fact that the cylindrical tube 14 may be turned within the solidified material, as may be necessary in unscrewing the device from the container, without danger of injury to the flat tube or flask 7, since the cylindrical tube 14 will turn in the solidified material without substantial deformation and may thus be withdrawn from the container. After being withdrawn the tube 14 may be removed endwise from off the flask 7. Without the tube 14, the unscrewing of the pressure gauge, while the flask was embedded in solidified material, would twist and break the flask.

As shown in Fig. 1, the neck 7ᵃ of the flask 7 is attached directly to the stem 4 of the gauge, and the gauge stem is attached to the upper end of a tubular rigid housing or casing 17 rather than being screwed directly into the wall of a pressure container, such, for example, as a generator. This arrangement may be desirable where the gauge is to be mounted upon the end of a length of pipe. The housing 17 defines a substantially cylindrical chamber, of an internal diameter not greatly exceeding the diameter of the tube 14—the housing 17 being of such length as to extend down below the lower end of the tube 14 and also below the lower end of the flask 7. The tubular guard casing or housing 17 is externally screw threaded at its upper end at 19 for the reception of a coupling 20 which is internally threaded at its upper end for the reception of the stem 4 of the gauge. The housing 17 is screw threaded at its lower end at 18 for the reception of a pipe or nipple. The upper end of the guard cylinder 14 fits snugly within a bore in the coupling 20 and the latter may be provided with a pin or pins 21 normally engaging a slot or slots 22 in the upper end of the guard casing 14 to prevent the latter from turning, although permitting the guard casing 14 to be slipped off endwise from the flask 7 when it is desired to clean the parts, after the gauge has been removed from the upper end of the housing 17.

In Fig. 3 a modified construction is illustrated wherein the neck 7ᵃ of the flask 7 is welded to the lower end of a tailpiece 23 rather than directly to the stem of the gauge. This tailpiece 23 is tubular and screw threaded at its upper end 24 for connection to the lower end of the stem 4ᵃ of the gauge. The lower end of this tailpiece 23 is furnished with a head 23ᵃ which fits within a counterbore in the upper end 25 of the cylindrical housing 17ᵃ, the parts 23 and 17ᵃ being normally united by the union nut 26. Preferably an outer sleeve 27 engaging the upper part of the nut 26, bridges the space between the nut and the lower end of the stem 4ᵃ. With this arrangement the flask need not be permanently united to the gauge, so that an ordinary gauge may be employed and one gauge substituted for another without reference to the presence of the pressure flask.

In the arrangement shown in Fig. 3, the cylindrical tube 14 is omitted. However, since the housing 17ᵃ (corresponding to the housing 17 of Fig. 1) is rigid, longer than the flask 7 and has an internal bore but little in excess of the maximum transverse dimension of the flask, this housing 17ᵃ necessarily functions to guard the flask against mechanical injury, for example blows, and thus to a certain extent performs the function of the guard cylinder 14 of Fig. 1.

Figures 4 and 5 illustrate slight modifications of the arrangement of Figs. 1 and 3 respectively. In Fig. 4 the guard cylinder 14 is removably secured to the lower end of a short tail piece or adaptor 23ᵃ, for example, by means of removable screws 22ᵃ. This tail piece 23ᵃ rests upon the upper end of the outer cylindrical housing 17ᵇ and is removably secured to the latter by means of a union nut 26ᵇ. The arrangement of Fig. 5 is substantially like that of Fig. 4, except that the inner guard casing 14, shown in Fig. 4, is omitted in the construction shown in Fig. 5.

The housings 17ᵇ of Figs. 4 and 5 correspond in general to the housings 17 and 17ᵃ of Figs. 1 and 3 in structure and function and have the inherent characteristic of protecting or guarding the parts housed within them from mechanical injury.

When it is attempted to use a Bourdon tube gauge to indicate very high hydraulic pressures, for example, pressures of the order of 50,000 pounds per square inch, the tube must be of such wall thickness to avoid bursting that the motion of its tip is very slight in response to increments of pressure, and a highly magnifying gauge movement must be used in order to cause the index to travel over the entire scale. By the use of a pressure flask such as herein disclosed, in association with a Bourdon tube gauge, this difficulty is avoided and it becomes possible to use a gauge designed for a low pressure range and having a relatively thin-walled and sensitive Bourdon tube, for indicating pressures in a range which would burst or permanently deform the tube if admitted directly thereto.

The theory of such operation may perhaps be crudely illustrated as follows: Let it be assumed that one end of a rigid cylindrical tube is closed by a thick diaphragm and that the opposite end of the tube is closed by a relatively thin diaphragm, and that the space between the diaphragms is completely filled with an incompressible liquid. Let it be further assumed that the material of the first diaphragm is so thick, stiff and rigid that it will deflect inwardly 1/100 of an inch when subjected to an external pressure of 1000 pounds per square inch, while the material of the other diaphragm is light and thin and will deflect to an equal amount when subjected to a pressure of but 10 pounds per square inch. (Atmospheric pressure is neglected in each case.)

If now the 1000 pound pressure be applied to the outer surface of the first diaphragm, the latter will move inwardly, pressing the liquid against the inner surface of the other diaphragm and thus deflecting the latter outwardly. Since the liquid is assumed to be incompressible and fills the interior of the tube, and since the second diaphragm inherently resists deformation and can only be deflected to the amount of 1/100 of an inch by the application of an internal pressure of 10 pounds per square inch, it follows that before the first diaphragm can be deflected inwardly 1/100 of an inch, the external pressure upon it must have risen at least to 1010 pounds per square inch. However, when such an external pressure acts on the first diaphragm, the second is, in theory at least, exposed at its inner surface to but approximately 10 pounds per square inch, since the volume of the liquid is assumed to be constant.

While, in the actual closed system of the present invention, the flask and tube do not respond to applied pressures in the simple way referred to in the above illustration, the principle of protecting the light and sensitively responsive Bourdon tube from a very high external pressure by the interposed flask and liquid pressure-transmitting medium, is approximately the same. Thus the resilient walls of the pressure flask may be so made as to resist deformation in response to applied pressure to a much greater degree than the Bourdon tube, and although the external pressure acting upon the flask may be very high, the liquid pressure within the closed space may be relatively low. Thus by proper choice of a pressure flask for association with the gauge, it is possible, for example, to use a gauge having a Bourdon tube designed to respond to pressures of the order of 25,000 pounds per square inch in measuring hydraulic pressures which actually go up to 50,000 pounds per square inch.

While certain desirable embodiments of the invention have been shown and described by way of example, it is to be understood that the invention is not necessarily limited to these particular embodiments but is broadly inclusive of any such modifications and variations, as well as the substitution of equivalents, as may fall within the scope of the appended claims.

I claim:

1. In a pressure-indicating apparatus, in combination, a pressure gauge having a movable pressure-responsive actuating element constituting a portion of the wall of a closed fluid-containing space, a hollow body whose interior forms part of said space, said hollow body having a tubular neck portion of annular transverse section and a body portion having resiliently yieldable walls, exposed at its outer side to the medium whose pressure is to be indicated, a pressure-transmitting liquid within said closed space, means uniting the hollow body to the gauge, a housing removably united to the gauge and constituting a support for the gauge, a guard member within the housing arranged to protect the hollow body from injury, said guard member being spaced from the interior surface of the housing and from the exterior surface of the body portion of said hollow body, and means uniting the guard member to the gauge.

2. A pressure-indicating apparatus of the kind which includes a substantially conventional pressure gauge having a case provided with a tubular stem by means of which it may be supported, said gauge comprising a movable pressure-responsive actuating element constituting a portion of the wall of a closed fluid-containing space, a hollow pressure flask having an unobstructed interior chamber which constitutes a part of said closed fluid-containing space, a body of mobile pressure-transmitting liquid completely filling said space, the flask having at one end a tubular neck of annular section, and means connecting the neck of the flask to the gauge, the opposite end of the flask being permanently closed, characterized in that the flask has an elongate body portion of diametrically flattened tubular form, the flat sides being substantially parallel and united by outwardly convex portions of the material of the flask, said flat walls being of thin flexible material and capable of moving toward and from each other in response to fluctuations in external pressure to which said body portion may be subjected, and a rigid elongate housing having a substantially cylindrical bore within which the pressure flask is normally positioned, said bore being of a diameter slightly exceeding the maximum transverse dimension of the body portion of the flask although permitting the pressure fluid to act on all sides of the flask and being open at its lower end to admit the pressure fluid, and further characterized in that the connecting means comprises a rigid unitary adapter to which the tubular end of the flask is molecularly and permanently united to form a leak-tight joint, said adapter having provision for securing it to the gauge, and a union nut removably connecting the upper end of the cylinder to the adapter.

FRANK H. HOPKINS.